Oct. 19, 1965       R. H. BLEWETT       3,212,510
BOTTLE WASHING MACHINE
Filed Sept. 12, 1963       3 Sheets-Sheet 1

ROBERT H. BLEWETT
INVENTOR:

BY
Bierman + Bierman

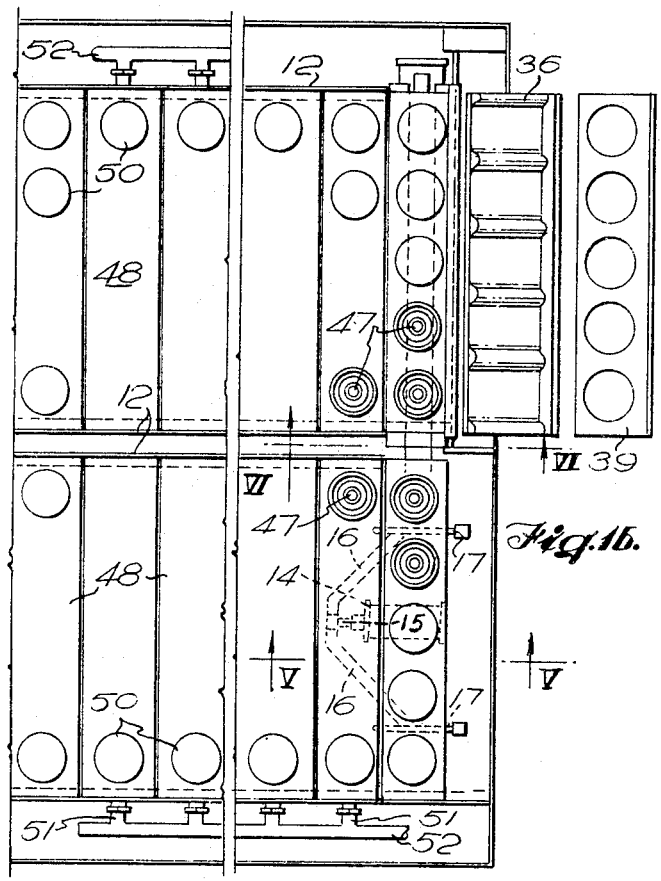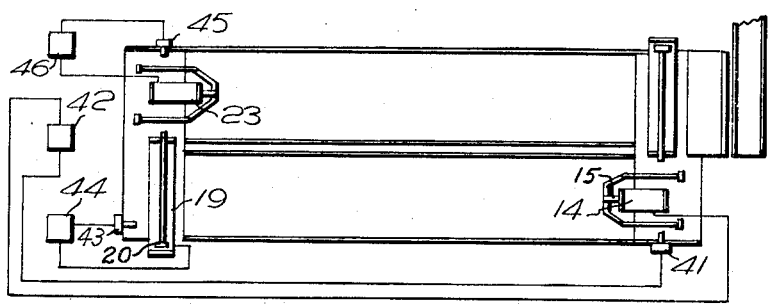

Oct. 19, 1965   R. H. BLEWETT   3,212,510
BOTTLE WASHING MACHINE

Filed Sept. 12, 1963   3 Sheets-Sheet 3

Robert H. Blewett
INVENTOR:

BY
Bierman & Bierman

United States Patent Office 3,212,510
Patented Oct. 19, 1965

3,212,510
BOTTLE WASHING MACHINE
Robert Howell Blewett, Royton, England, assignor to Bowash Limited
Filed Sept. 12, 1963, Ser. No. 308,456
Claims priority, application Great Britain, Sept. 13, 1962, 34,939/62
12 Claims. (Cl. 134—46)

This invention concerns washing machines and particularly though not exclusively bottle washing machines for use in dairies whose work includes the bottling of sterilized milk.

As is known, sterilized milk is capable of being kept for relatively long periods of time due to the fact that bacteria normally present in the milk have been rendered harmless by the sterilizing process. If, however, the bottles into which the milk is placed are themselves not free from bacteria the effectiveness of sterilization of the milk is rendered useless since bacteria in the bottles will cause the milk to turn sour.

The washing machine of the present invention may also be used for washing bottles for other than sterilized milk and, of course, for washing containers that are not to contain milk at all.

There are washing machines available for use in large capacity plants and such machines are basically of a construction including a conveyor chain or chains for transportation of bottle carriers. In these machines there is the disadvantage that the chains are subject to wear and, what is more important, the chains stretch after a period of use. In the case where the chains have stretched the bottle cannot accurately be aligned with the normally used jets which serve to supply the washing liquid and, therefore, the bottles are not efficiently washed. In some cases the chain stretch may be sufficient to cause the bottles to be so much misaligned with the jets that the interior of the bottle is not washed at all. This situation can exist in the case where the bottles are intended to be periodically stopped at each stage of the washing process and also in the case in which the bottles move continuously and the jets are arranged to have limited movement which should be synchronised with bottle movement to ensure efficient washing. The machines above referred to are, in addition to possessing the disadvantage specified, expensive to produce and maintain.

The smaller machines possess the disadvantage that they are incapable of high output and also they are usually fed by hand and emptied by hand.

The object of the present invention is to provide a machine which will ensure efficient washing, by accurate location of the bottles over the jets, at all times and to employ the smallest number of moving parts consistent with efficient washing.

According to the present invention a washing machine is characterised in that there are provided a plurality of separate bottle or other similar container receiving units adapted to be arranged upon stationary slideways, the units being adapated to be moved along the slideways pneumatically or hydraulically without the use of conveyor chains, belts or the like.

Preferably the machine slideways are arranged in such manner that the bottle receiving units are moved in a rectangular path in one plane through the machine.

In one form of machine the bottle receiving units are moved intermittently around the slideways, the movement being so timed that the units are stationary at predetermined locations for predetermined periods of time to enable a pre-set sequence of washing to be carried out.

The invention will be described further, by way of example, with reference to the accompanying drawings in which:

FIGS. 1A and 1B are broken plan views of part of a bottle washing machine made in accordance with the invention, parts being omitted for clarity.

Figure 1A:
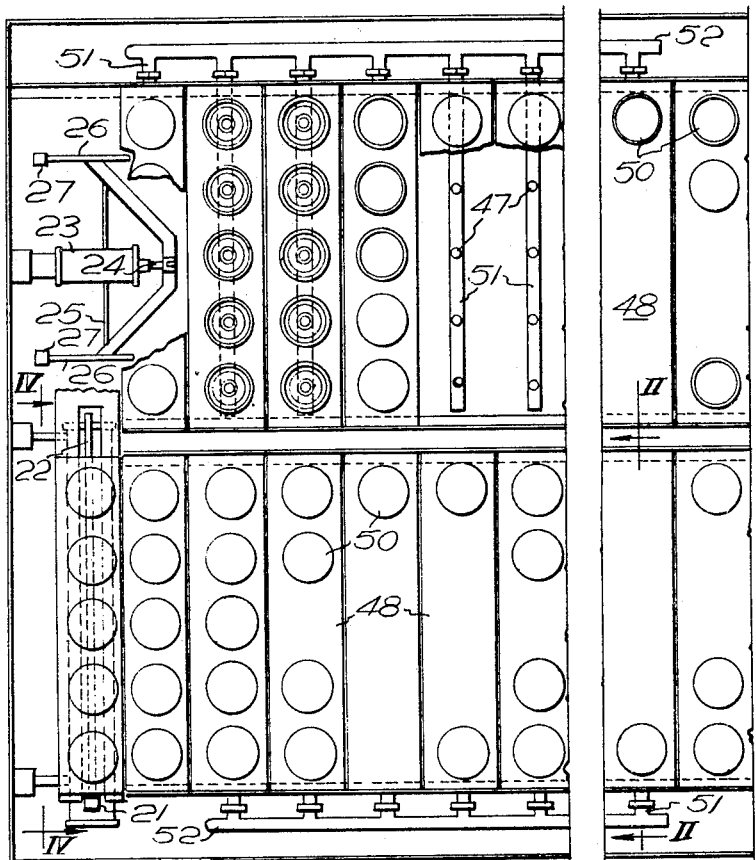
Figure 2:
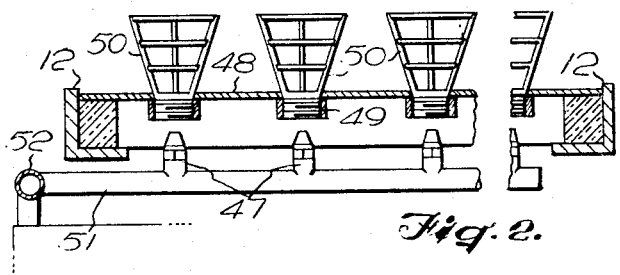
FIG. 2 is a section on the line II—II of FIG. 1 and, FIG. 3 is a schematic illustration of the means for moving bottle carriers around the washing machine.
Figure 4:
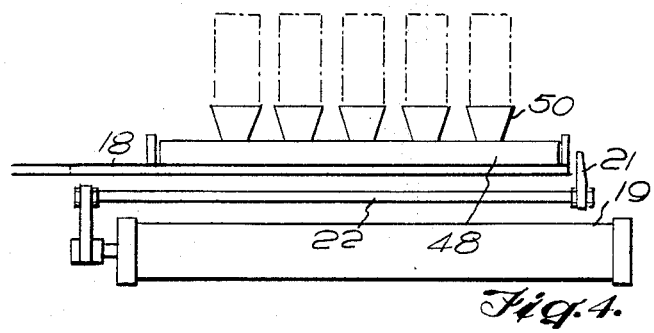
FIG. 4 is a section on the line IV—IV of FIG. 1A.
Figure 5:
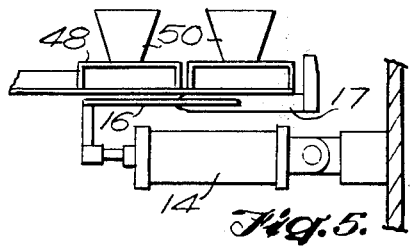
FIG. 5 is a section on the line V—V of FIG. 1B.
Figure 6:
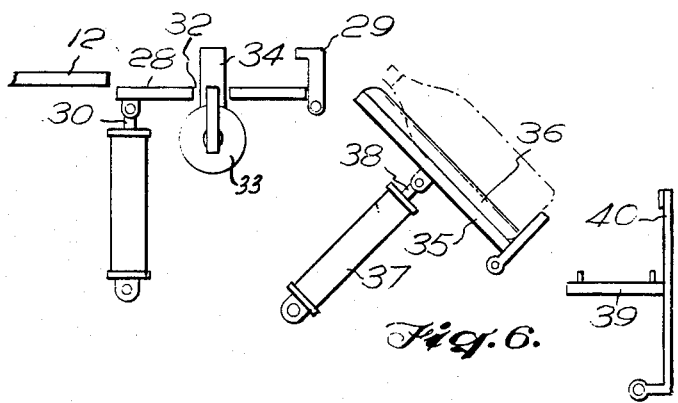
FIG. 6 is a section on the line VI—VI of FIG. 1B.

A bottle washing machine made in accordance with the invention consists of a framework carrying slideways arranged in a rectangular path in one plane, the feed and exit positions 10 and 11 of the machine lying adjacent one another at one end of the machine. Two longitudinal slideways are provided and these lie parallel to each other, each slideway consisting of a pair of spaced-apart angle section members 12 preferably constructed from stainless steel. The members 12 are arranged to have their horizontal limbs directed towards each other.

At the feed end 10 of the machine is provided a platform 13 located below one of the slideways. The platform 13 carries a pneumatic cylinder 14 the ram 15 of which is directed along the length of the slideway and between the angle section members 12 thereof. The ram 15 carries two angularly disposed arms 16 which project away from the slideway. Each arm 16 is provided at its outer end with an inverted L shaped member 17 the arm of which extends upwardly to the level of the slideway. The leg of the L projects towards the end of the slideway The stroke of the ram 15 is such that a bottle carrier (yet to be described) will be moved a distance along the slideway equal to its width so that a bottle carrier can be moved from the feed slideway to the return slideway. At the other end of the slideway is provided a transversely positioned slide 18 and below this slide 18 is a second pneumatic cylinder 19, the ram 20 of which is directed transversely of the machine towards the end of the other slideway, herein referred to as the return slideway. The stroke of the ram 20 is such that a bottle carrier will be moved transversely of the machine a distance equal to the length of the bottle carrier plus the spacing between the slideways.

The ram 20 of the second cylinder 19 is connected to a vertically disposed push rod 21 which extends through a slot 22 in the transverse slideway 18.

At the end of the return slideway, adjacent the second pneumatic cylinder 19 is a third pneumatic cylinder 23 whose ram 24 is located between and below the members of the return slideway. The ram 24 is provided with a cross member 25 and rearwardly extending arms 26. The rearwardly extending arms 26 are provided with upwardly directed limbs 27. The stroke of the ram 24 is such that a bottle carrier will be moved a distance equal to its width along the return slideway.

At the other end of the return slideway is provided a tiltable platform 28 onto which a bottle carrier can be pushed. The platform 28 is provided with a lip 29 along its outermost edge and this lip serves to overlie the edge of a bottle carrier. The platform is pivoted at its outer edge and attached to the underside of the inner edge is the ram 30 of a pivotally mounted pneumatic cylinder 31. The stroke of the ram 30 is such that the platform 28 can move from a horizontal to a vertical position. The platform is slotted (as shown at 32) and below the platform is a pneumatic cylinder 33 the ram of which is attached to a vertically disposed bar 34. The cylinder 33 is disposed transversely of the return slideway and its stroke is such that it can move a bottle carrier across the machine to locate it upon the feed slideway.

Adjacent the platform 28 is an angularly downwardly disposed bottle receiving table 35 which is pivoted at its edge remote from the platform. The table 35 is provided with bottle spacing ribs 36 on its upper surface. The ribs are preferably resilient to obviate the risk of bottle breakage. Below the table is pivotally mounted a pneumatic cylinder 37 the ram 38 of which has a stroke sufficient to move the table 35 into a vertical position. Adjacent the pivoted edge of the table 35 is a conveyor 39 onto which bottles are placed when the table 35 is tilted. The conveyor 39 is slightly greater in width than a bottle diameter and located at the edge of the conveyor remote from the table is a pivotally mounted guard fence 40. The guard fence is connected to a micro switch which is wired to the main switch of the machine and in the event of this fence being moved by virtue of bottles becoming jammed on the conveyor the micro switch will be operated to stop the machine.

At the outer edge of the feed slideway is located a micro switch 41 which is positioned to be operated when a bottle carrier is moved from the end of the return slideway to the feed slideway. This micro switch is adapted to operate a pneumatic valve 42 which in turn causes air to be fed to cylinder 14 to move the ram and push bottle carriers along the feed slideway. At the end of the feed slideway is a second micro-switch 43 which is arranged to operate a pneumatic valve 44 which in turn causes air to be fed to the cylinder 19 to cause transfer of a bottle carrier from the feed slideway to the return slideway.

At the outer edge of the return slideway opposite to the cylinder 19 is a third micro-switch 45 which is adapted to operate a pneumatic valve 46 which causes air to be fed to cylinder 23 to cause the bottle carrier to be moved along the return slideway.

The pneumatic valves are of the double acting type and after the various rams have operated to move the bottle carriers they are operated in the reverse sense to cause the rams to return to their original positions.

The micro switches are so arranged that intermittent movement of the bottle carriers around the slideway is achieved.

Below the slideways, at spaced intervals, are transverse rows of jets 47 which serve to supply washing and rinsing liquids to the bottles as they are carried round the slideways. Similar jets (not shown) are located above the slideways.

Each bottle receiving unit is identical and comprises a channel section strip of material 48, for example, mild steel, having five or more apertures 49 therein. Each aperture 49 contains a bottle receiving cone 50 whose shape is such that it will hold a bottle neck, the bottles being located in an inverted position on the unit, as indicated. The ends of the bottle carrier are provided with nylon blocks 51 which are positioned to lie on the slideways.

The jets 47 above referred to are located on branch pipes 51 which are connected to supply pipes 52. The branch pipes 51 are supplied in groups with washing liquid and rinsing liquid from supply tanks (not shown), suitable pumps are provided for this purpose. The grouping of the branch pipes 47 is as follows:

(1) Adjacent the feed end of the feed slideway a group of five rows of pipes for prerinsing dirty bottles inside and out.

(2) Spaced from the pre-rinse pipes a first group of ten rows of detergent liquid pipes.

(3) At the entrance end of the return slideway a second group of ten rows of detergent liquid pipes.

(4) Spaced from the second group of detergent liquid pipes a group of three rows of hot rinse pipes, and (5) Spaced from the hot rinse pipes a group of two of final rinse pipes.

The spaces between groups of pipes are used to allow the bottles to drain before passing to the next group.

Clearly the groupings above set out may be modified if desired. Preferably the spaces between group is equivalent to not less than the width of two bottle carriers.

In use assuming the machine slideways to be filled with units except for a space at the entrance end of the feed slideway an empty carrier is pushed into the empty space by the ram of cylinder 33 and is loaded with bottles. This carrier is then pushed hard up against the micro switch 41 to set in motion the cycle of operations which consists of moving all the units on the return slideway by the ram of the cylinder 23, thereby making room on the platform 18 for a carrier to be transferred by the ram of cylinder 19. Upon return of the ram of the cylinder 19, the ram of the cylinder 14 pushes all of the carriers along the feed slideway to locate a further carrier in position for transfer. The carrier in this position operates the micro switch 43.

The carrier at the end of the return slideway is tilted as referred to above and the bottles deposited on the table 35. The empty carrier is now ready for reloading. The bottles are transferred from table 35 to conveyor 39 for transmission to a filling and capping machine.

Assuming it takes twelve seconds to empty and reload a carrier, this means that the carriers are moved one position at twelve second intervals and thus with the grouping of jets and feed pipes above specified, the pre-rinse lasts in all for one minute, the first and second detergent rinses each for two minutes, the hot rinse for thirty-six seconds and the final rinse for twenty-four seconds; between each operation there is a drain period which, in the particular arrangement being described, is as follows: First drain, twenty-four seconds; second drain, including transfer, twenty-four seconds; third drain, twenty-four seconds; fourth drain, twenty-four seconds; fifth drain, including emptying of the unit, twenty-four seconds. Clearly the times given can be varied to suit particular requirements.

Preferably the washing and rinsing liquids are used repeatedly and water is added when necessary.

After use the pre-rinse water is run to waste. The detergent may be used many times before it is disposed of.

The invention is not restricted to the above details. For example, it is possible to arrange for the bottles to be automatically loaded into the bottle receiving units.

The principal advantages of the machine described lie in the fact that the bottles are always accurately located with their necks lying in line with the jets and in particular the center of the jet is always located in line with the longitudinal centre line of the bottle thereby ensuring highly efficient washing of the interior of the bottle.

Since the bottle carrying units are not fixed to the slideways they are easily interchangable and replaceable which makes cleaning of the machine simple. It is also possible easily to modify the machine by changing the units, the jets and the discharge table so that the machine can be used to wash all types of container with equal efficiency.

Steam may be used for finally sterilizing the bottles after washing is so desired.

I claim:

1. In a machine for washing bottles and the like, a pair of stationary slideway in approximately the same plane and in parallel arrangement and adjacent to each other, a plurality of bottle receiving units, each unit adapted to fit into said slideways and move longitudinally therein, each unit adapted to hold a plurality of bottles in side-by-side relationship transversely of said slideways, means positively for feeding said units at one end of one slideway, means at said one end for positively propelling said units at said one end a distance approximately equal to the width of one unit, means for positively shifting the unit at the other end of said one slideway transversely onto one end of the other slideway, means at said one end of said other slideway for positively propelling the units thereon a distance approximately equal to the width of one unit towards the feed end of said machine, a platform at the discharge end of said other slideway, said propelling means adapted to move the endmost unit onto said platform and off of said other slideway and means for spraying liquid onto said units from below said slideways.

2. A bottle washing machine as set forth in claim 1 in which said slideways comprise spaced apart angle sectioned members adapted individually removably to receive bottle receiving units.

3. A bottle washing machine as set forth in claim 1 in which said means for moving said bottle receiving units intermittently along said slideways includes micro switches and fluid valves, said valves being associated with cylinders, rams in said cylinders, adapted to push said bottle receiving units along said slideways and transfer bottle receiving units individually from one slideway to the next.

4. A bottle washing machine as set forth in claim 1 in which said means for moving said bottle receiving units are positively operated by micro switches and fluid valves both to cause movement of rams while moving said bottle receiving units and to return said rams to a re-set position.

5. A bottle washing machine as set forth in claim 1 in which one of said slideways is a return slideway, a tiltable platform at the end of said slideway positioned to receive successive bottle receiving units and to tilt same to unload bottles herefrom, a tiltable table adjacent said tiltable platform to receive said bottles and to transfer them to a distributing means.

6. A bottle washing machine set forth in claim 1 in which a table adjacent to said platform is tiltable in a direction away from said second slideway.

7. A bottle washing machine as set forth in claim 1 in which a table adjacent to said platform is tiltable in a direction away from said second slideway and a takeoff conveyor is located adjacent to the table for reception of a unit therefrom.

8. A bottle washing machine as set forth in claim 1 in which a series of transverse spaced ribs on said platform provide spaces therebetween for the reception of single bottles.

9. A bottle washing machine as set forth in claim 1 in which a table adjacent to said platform is tiltable in a direction away from said second slideway and a takeoff conveyor is located adjacent to the table for reception of a unit therefrom and a guard fence on said takeoff conveyor.

10. A bottle washing machine as set forth in claim 1 in which a table adjacent to said platform is tiltable in a direction away from said second slideway and a takeoff conveyor is located adjacent to the table for reception of a unit therefrom and a guard fense on said takeoff conveyor and switch means and circuit thereof are adapted to operate said propelling means at said feed end.

11. A bottle washing machine as set forth in claim 1 in which means are provided for simultaneously moving and stopping respectively both of said propelling means.

12. A bottle washing machine as set forth in claim 1 in which said propelling means are located below said slideways.

References Cited by the Examiner

UNITED STATES PATENTS

| | | | |
|---|---|---|---|
| 354,199 | 12/86 | Lorimer | 214—16.14 |
| 1,421,055 | 6/22 | Adams | 134—82 |
| 1,651,208 | 11/27 | Holmes | 134—68 |
| 1,680,106 | 8/28 | Manning | 134—82 X |
| 1,684,827 | 9/28 | Hippenmever | 134—134 X |
| 1,697,894 | 1/29 | Wright | 134—82 X |
| 1,734,065 | 11/29 | Werotte | 214—16.14 |
| 2,846,098 | 8/58 | Kopp | 198—85 X |
| 2,903,120 | 9/59 | Thomas | 214—16.14 |
| 3,058,276 | 10/62 | Palma | 53—290 X |
| 3,132,655 | 5/64 | Anderson | 134—68 |

FOREIGN PATENTS 715,283   9/54   Great Britain.

CHARLES A. WILLMUTH, *Primary Examiner.*

G. J. NORTH, *Examiner.*